United States Patent [19]

Lindsey

BEST AVAILABLE COPY

[11] E Re. 29,069

[45] Reissued Dec. 14, 1976

[54] PULLING OVER MECHANISM

[75] Inventor: William C. Lindsey, Milford, Mass.

[73] Assignee: International Shoe Machine Corporation, Nashua, N.H.

[22] Filed: Apr. 2, 1976

[21] Appl. No.: 672,921

Related U.S. Patent Documents

Reissue of:

[64] Patent No.: 3,902,211
Issued: Sept. 2, 1975
Appl. No.: 505,412
Filed: Sept. 12, 1974

[52] U.S. Cl. ..... 12/14.5
[51] Int. Cl.[2] ..... A43D 23/00
[58] Field of Search ..... 12/14.5, 9–11.3

[56] References Cited

UNITED STATES PATENTS

| | | | |
|---|---|---|---|
| 3,233,261 | 2/1966 | Kamborian et al. | 12/14.5 |
| 3,579,693 | 5/1971 | Robinson | 12/14.5 |
| 3,715,767 | 2/1973 | Muhlbach et al. | 12/14.5 |

FOREIGN PATENTS OR APPLICATIONS

| | | | |
|---|---|---|---|
| 456,885 | 3/1973 | Australia | 12/14.5 |
| 1,357,899 | 6/1974 | United Kingdom | 12/14.5 |

*Primary Examiner*—Patrick D. Lawson
*Attorney, Agent, or Firm*—Albert Gordon

[57] ABSTRACT

A pulling over mechanism for stretching about a last toe portion of an upper that is mounted on the last preparatory to wiping the margin of the toe portion of the upper against an insole that is located on the last bottom. The mechanism includes pincers jaws that are caused to grip the upper margin under relatively light force while the last is raised to allow the upper margin to slip between the pincers jaws. After the last has completed its rise, the pincers jaws are caused to grip the upper margin under relatively heavy force so as to preclude slippage of the margin between the pincers jaws if the pincers should be lowered to relocate the stretched upper on the last.

6 Claims, 15 Drawing Figures

PULLING OVER MECHANISM

Matter enclosed in heavy brackets [ ] appears in the original patent but forms no part of this reissue specification; matter printed in italics indicates the additions made by reissue.

BACKGROUND OF THE INVENTION

In the toe lasting of shoes, wherein a shoe assembly is provided that comprises a last having an upper mounted thereon and an insole located on its bottom, it is standard practice to stretch the upper about the toe portion of the last by means of pincers jaws that grip the upper margin while the shoe assembly is supported on a support and the support is raised from a lower support position to an upper position. It is also known practice, after the support has completed its rise, to impart, if desired, downward movement to the pincers jaws to thereby relocate the stretched upper about the last if the stretched upper is not properly located at the completion of the rise of the shoe assembly.

With the recent introduction of knob nose shoes having a knob projecting upwardly of the toe portion of the vamp of the upper, greater stresses have been imparted to the portion of the upper stretched about the knob during the rise of the shoe assembly while the upper margin is gripped between the pincers jaws. At times, this has caused a tearing or rupturing of that part of the upper which is bearing against the knob. In order to alleviate this problem, the force applied to the upper margin by the pincers has been reduced so as to permit some slippage of the upper margin between the pincers jaws during the rise of the shoe assembly. However, when this pincers force is so reduced, the upper also undesirably tends to slip between the pincers jaws if the pincers jaws are lowered, subsequent to the rise of the shoe assembly, for the purpose of relocating the stretched upper about the last.

SUMMARY OF THE INVENTION

This invention solves the problem of tearing or rupturing the upper of knob nose shoes during the rise of the shoe assembly while the upper margin is gripped by the pincers jaws to stretch the upper about the last while enabling the stretched upper to be relocated on the last by a downward movement of the pincers after the shoe assembly has completed its rise. This is accomplished by providing mechanism that imparts a relatively light gripping force by the pincers jaws to the upper margin during the rise of the shoe assembly so as to permit slippage of the upper margin between the pincers jaws during this rise and that imparts a relatively heavy gripping force by the pincers jaws to the upper margin after the shoe assembly has completed its rise so that the pincers may be lowered to relocate the stretched upper on the last between the pincers jaws.

DESCRIPTION OF THE PREFERRED EMBODIMENT

Figure 1:
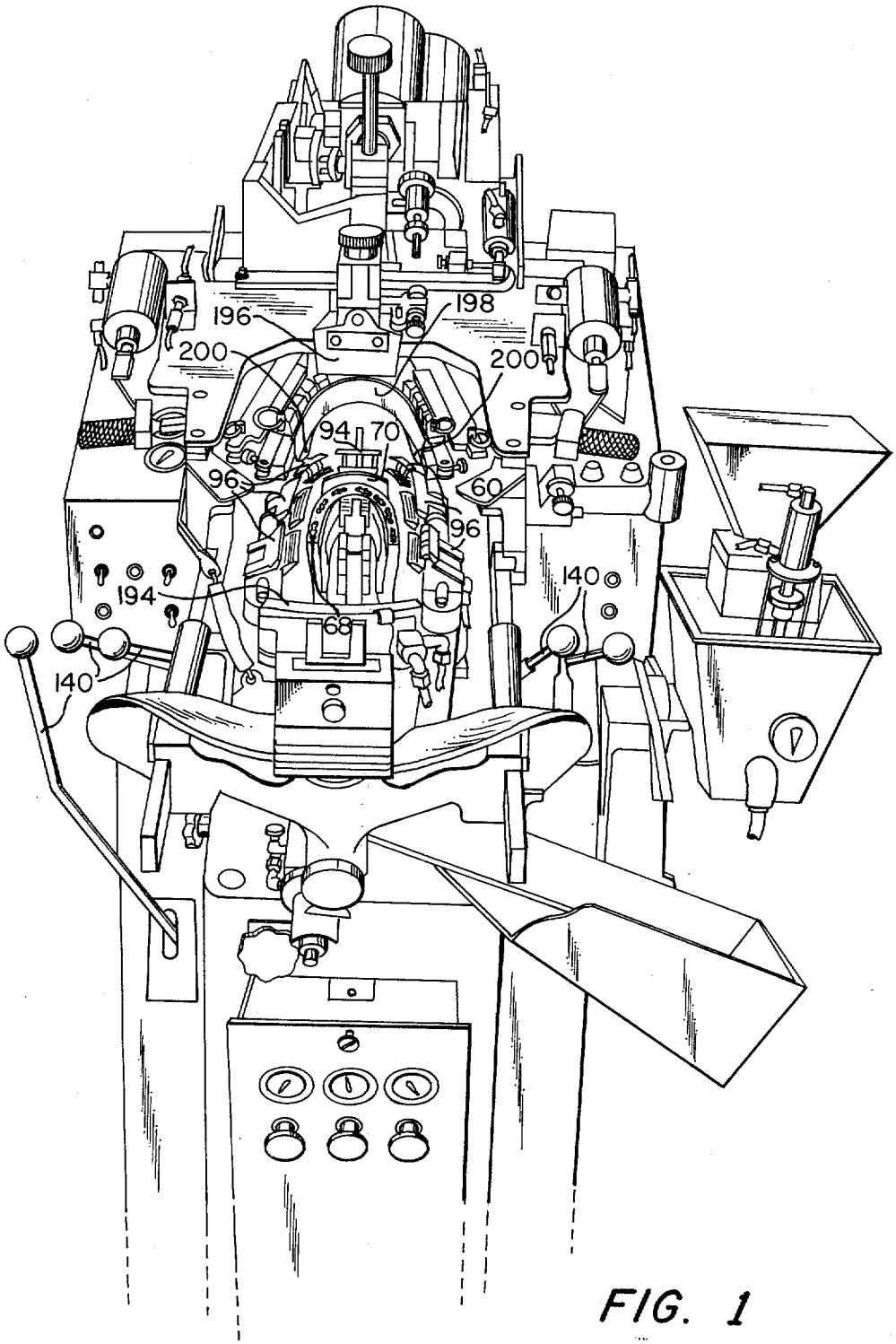
FIG. 1 is a view of a pulling over and toe lasting machine incorporating the invention.
Figure 2:
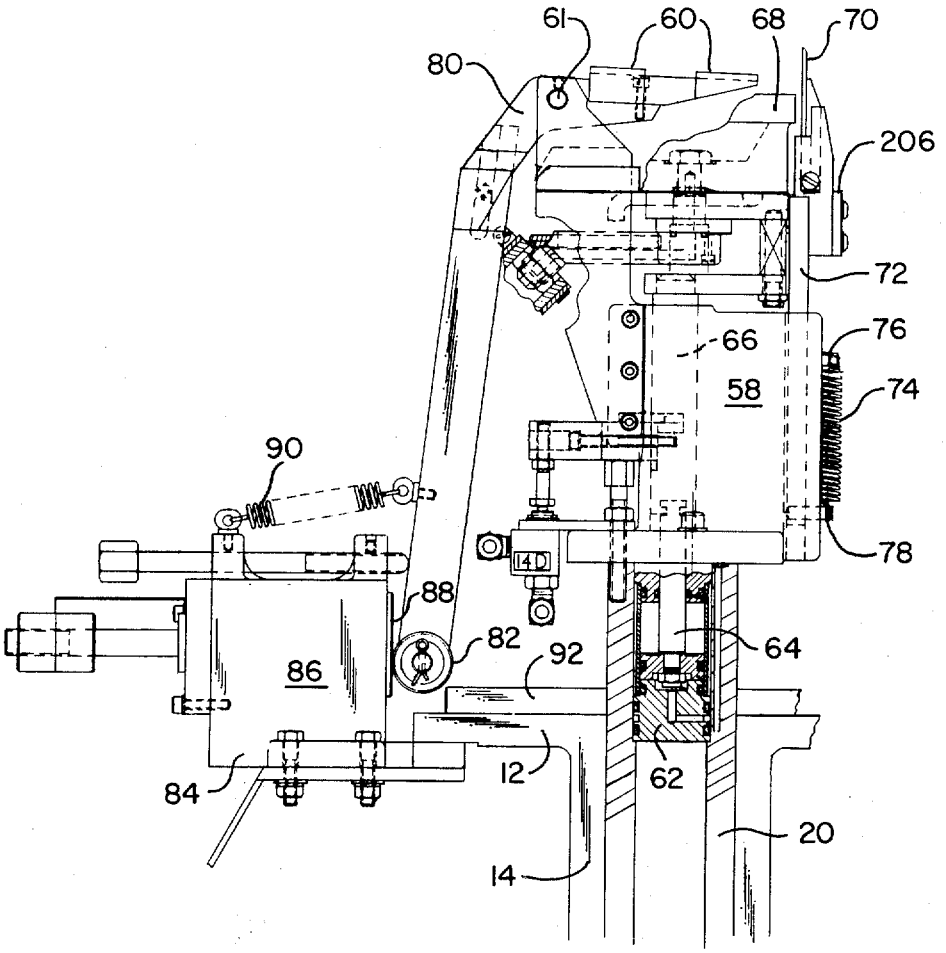
FIG. 2 is an elevation of a shoe assembly support.
Figure 3:
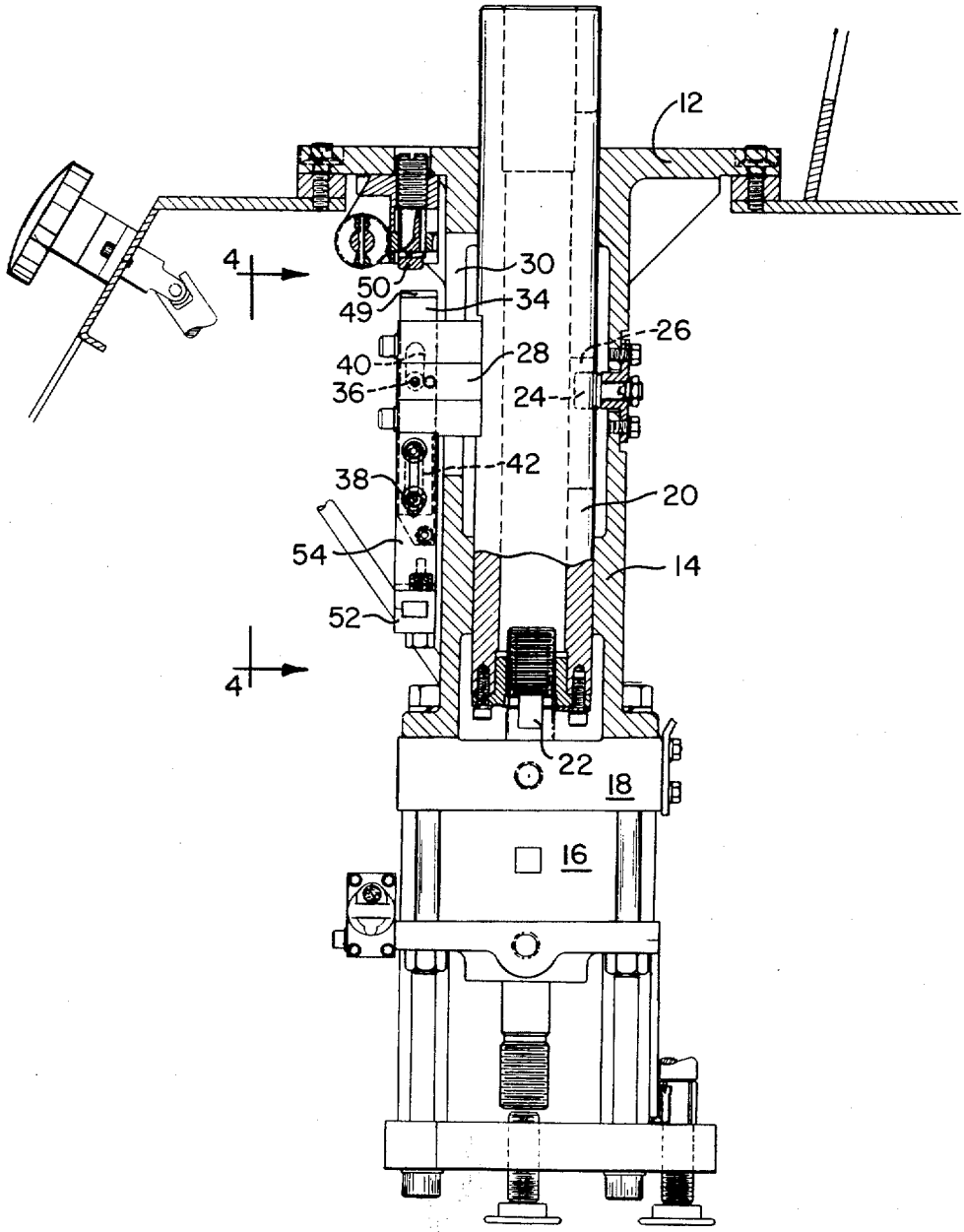
FIG. 3 is an elevation of a toe post.

Referring to FIGS. 2 and 3, the machine frame incorporates a base plate 12 that has a sleeve 14 extending downwardly therefrom. For convenience of operation, the machine is inclined about 30° from the horizontal. However, parts extending in the direction of the plate 12 will be referred to as extending horizontally and parts extending in the direction of the sleeve 14 will be referred to as extending vertically. The operator is intended to be located in front of the machine as seen in FIG. 1, and a direction extending toward the operator will be referred to as "forward" while a direction extending away from the operator will be referred to as "rearward".

An air operated motor 16 is secured to a cap 18 at the bottom of the sleeve 14 and a hollow toe post 20 is secured to the piston rod 22 of the motor 16 to extend vertically and be slidable within the sleeve 14. A roller 24, bolted to the sleeve 14, is received in a vertical slot 26 in the post 20 to preclude rotation of the post about the axis of the sleeve.

Figure 4:
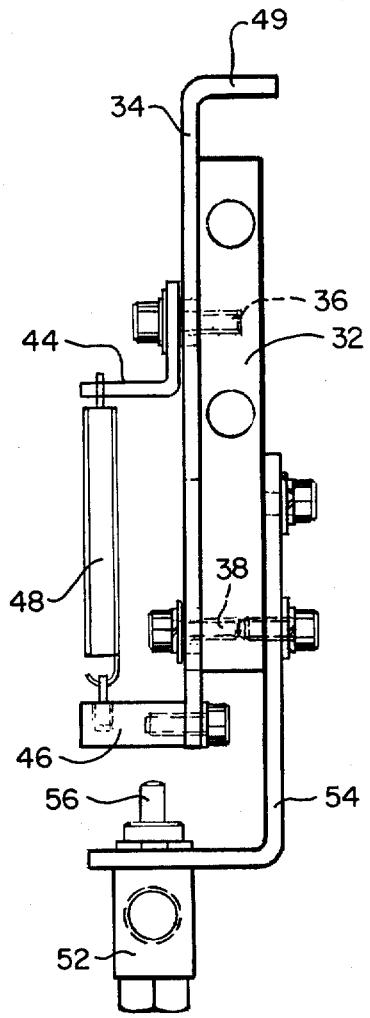
FIG. 4 is a view taken on the line 4—4 of FIG. 3.

Referring to FIGS. 3 and 4, a block 28 extends laterally of the post 20 through a slot 30 in the sleeve 14 and a plate 32 is affixed to the block 28. A strip 34 is mounted to the plate 32 for vertical movement by means that includes studs 36 and 38 affixed to the plate 32 that respectively extend through vertical slots 40 and 42 in the strip 34. A flange 44 that is rigid with the plate 32 is mounted to the stud 36. A pin 46 is rigidly mounted to the bottom of the strip 34. A tension spring 48 extending between and connected to the flange 44 and the pin 46 yieldably urges the strip 34 upwardly to the extent permitted by the slots 40 and 42. A flange 49 at the top of the strip 34 is below and in vertical registry with a stud 50 that is mounted to the plate 12. A valve 52 is mounted to a flange 54 that is secured to the plate 32. The actuator 56 of the valve 52 is below and in vertical registry with the pin 46.

As shown in FIG. 2, a mount 58 is secured to the top of the toe post 20 and an insole rest 60 is pivoted to the top of the mount 58 by a pivot pin 61.

An air actuated motor 62 is seated within the hollow of the toe post 20 near its top. The piston rod 64 of the motor 62 extends upwardly of the motor 62 and is connected to a post 66. The top of the post 66 is secured to a U-shaped cement applicator 68 (see FIG. 1) that extends about the insole rest 60.

A toe bar 70, located rearwardly of the applicator 68 and the insole rest 60, is connected to a post 72 that is mounted for heightwise movement in the mount 58. The toe bar 70 is yieldably urged upwardly by a tension spring 74 that is connected to and extends between a pin 76 anchored to the mount 58 and a pin 78 anchored to the post 72.

The pivot pin 61 pivotally supports a lever 80 intermediate its ends. The back of the lever 80 is secured to the insole rest 60 and the front of the lever 80, which extends downwardly of the pivot pin 61, has a roller 82 mounted thereto. A bracket 84 is connected to a plate 12 and an air operated motor 86 is mounted to the bracket 84. The roller 82 is yieldably urged against the piston rod 88 of the motor 86 by a tension spring 90 that is mounted to and extends between the motor 86 and the lever 80.

Figure 5:
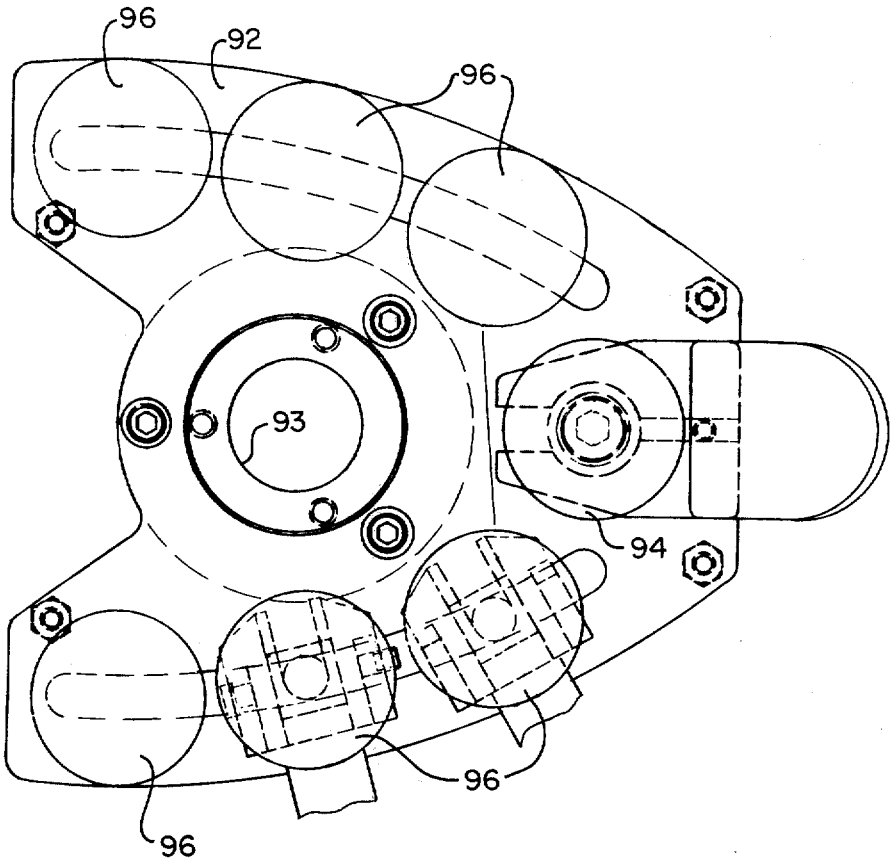
FIG. 5 is a plan view of a pincers base.

A pincers base 92 (FIGS. 2 and 5) is anchored to the top of the base plate 12. The base 92 has a opening 93 that slidably receives the toe post 20. A toe pincers assembly 94 is mounted to and extends upwardly of the rear end of the pincers base 92 and three side pincers assemblies 96 are mounted to and extend upwardly of the pincers base 92 rearwardly of the toe pincers assembly 94 on each side of the toe pincers assembly 94. The rear-most side pincers assemblies 96 closest to the toe pincers assembly 94 are corner pincers assemblies, the forwardmost side pincers [96] assemblies *96* furthermost from the toe pincers assembly 94 are ball pincers assemblies and the side pincers assemblies 96 between the corner pincers assemblies and the ball pincers assemblies are forepart pincers assemblies.

Figure 8:
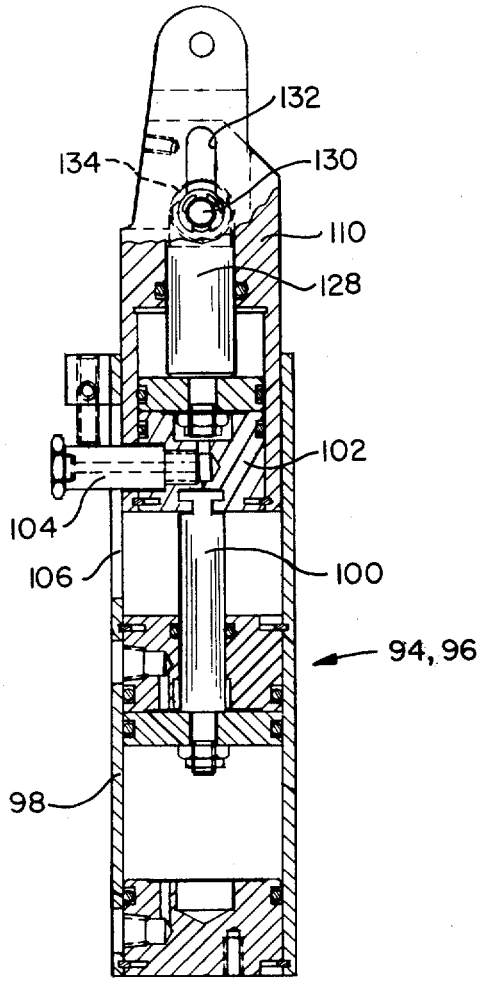
FIG. 8 is a partially sectional elevation of a pincers assembly.
Figure 10:
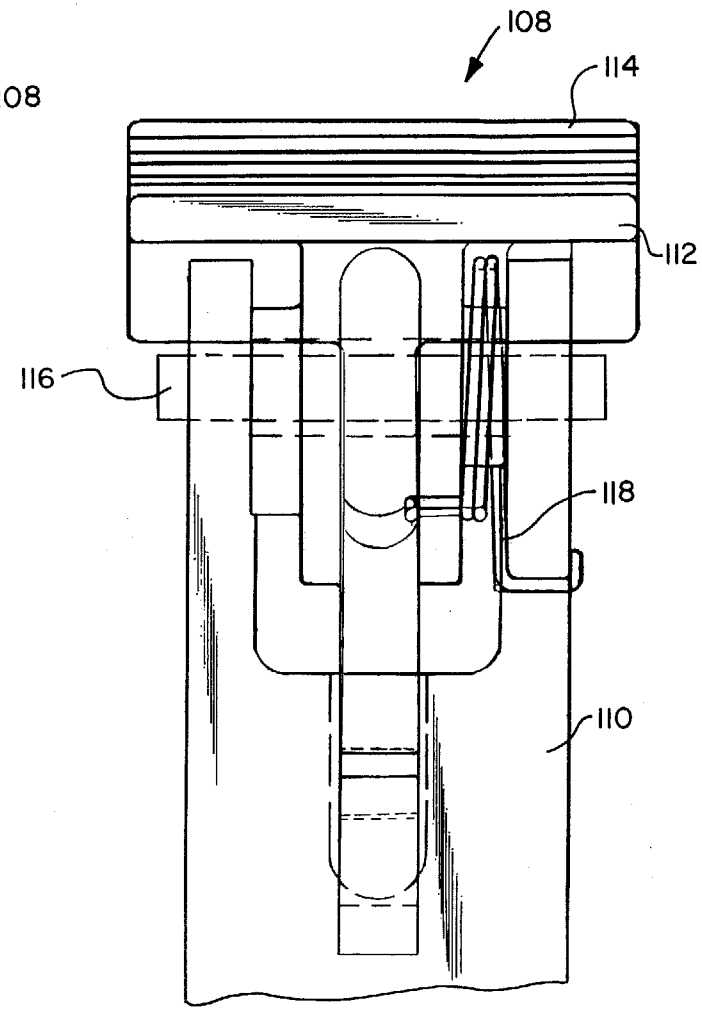
FIG. 10 is a view taken on line 10—10 of FIG. 9.
Figure 9:
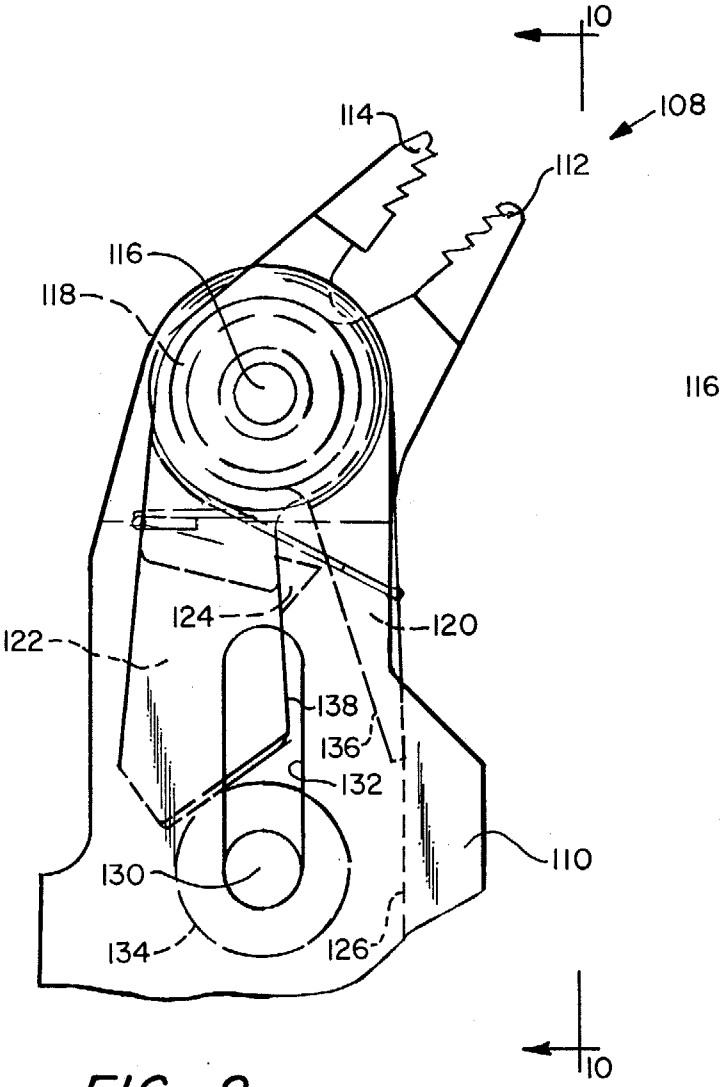
FIG. 9 is an elevation of a pincers.

Referring to FIGS. 8–10, each pincers assembly comprises an air actuated motor 98. The piston rod 100 of each motor 98 has an air actuated motor 102 connected thereto that is slidably mounted in its associated motor 98. An inlet pipe 104 of each motor 102 rides in a slot 106 formed in its associated motor 98 to preclude rotation of the motors 102 with respect to the motors 98. A pincers 108 is mounted to the top 110 of each motor 102. Each pincers 108 has an inner pincers jaw 112 and an outer pincers jaw 114, both jaws being pivoted to a motor top 110 by a pivot pin 116. A coil spring 118 extending between the motor top 110 and the outer jaw 114 acts to yieldably urge the outer jaw 114 counterclockwise as seen in FIG. 9 about the axis of the pivot pin 116. The jaws 112 and 114 respectively have legs 120 and 122 that depend downwardly of the pivot pin 116. The outward movement of the jaw 114 by the spring 118 causes the leg 122 to swing counterclockwise (FIG. 9) with a prong 124 on the leg 122 engaging the leg 120 to thus swing the inner jaw 112 counterclockwise until the leg 120 abuts a wall 126 of the motor top 110. In this position, the jaws 112 and 114 are spaced from each other as indicated in FIG. 9.

The piston rod 128 of each motor 102 has a pin 130 mounted to its top that is slidable in slots 132 in the motor top 110. A cam roll 134 is mounted on the pin 130 and is movable, as described below, between facing cam follower surfaces 136 and 138 on the jaw legs 120 and 122 in response to upward movement of the piston rod 128.

Figure 11:
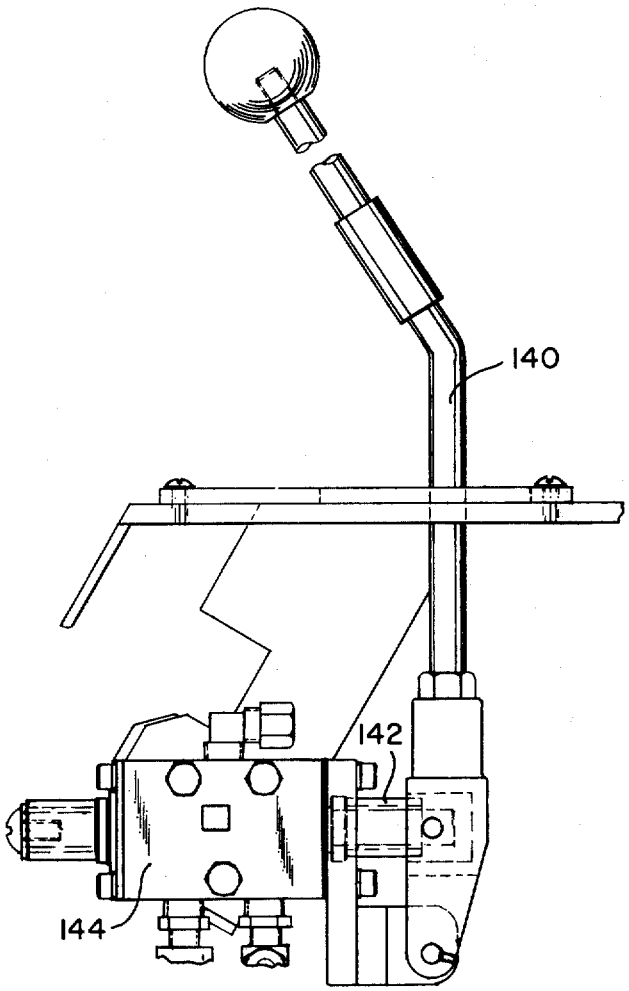
FIG. 11 is a view of a valve actuating machanism.

As shown in FIGS. 1 and 11, five handles 140 are pivotally mounted to the machine frame and each handle 140 is connected to the valve spool 142 of a valve 144, the valves 144 also being mounted to the machine frame.

In the idle condition of the machine: the piston rod 22 is retracted into the motor 16 so that the insole rest 60 is in a lowered position with the flange 49 located spacedly above the stud 50 and the valve actuator 56 located spacedly below the pin 46; the piston rod 64 is retracted into the motor 62 so that the cement applicator 68 is at a lower level than the insole rest 60 as shown in FIG. 2; the piston rod 88 is retracted into the motor 86; the piston rods 100 are projected upwardly of the motors 98 so that the motors 102 and the pincers 108 are in upper positions with respect to the pincers plate 92; and the piston rods 128 are retracted into the motors 102 so that the cam rolls 134 are located spacedly below the cam follower surfaces 136, 138, as indicated in FIG. 9, thus enabling the springs 118 to maintain the pincers jaws 112 in the open positions indicated in FIG. 9.

Figure 13:
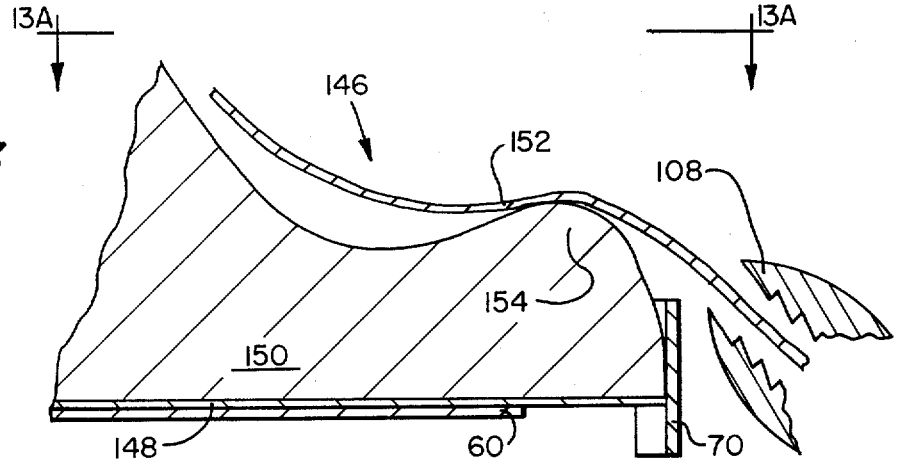
FIG. 13 is a representation of a shoe assembly in the machine.
Figure 13A:
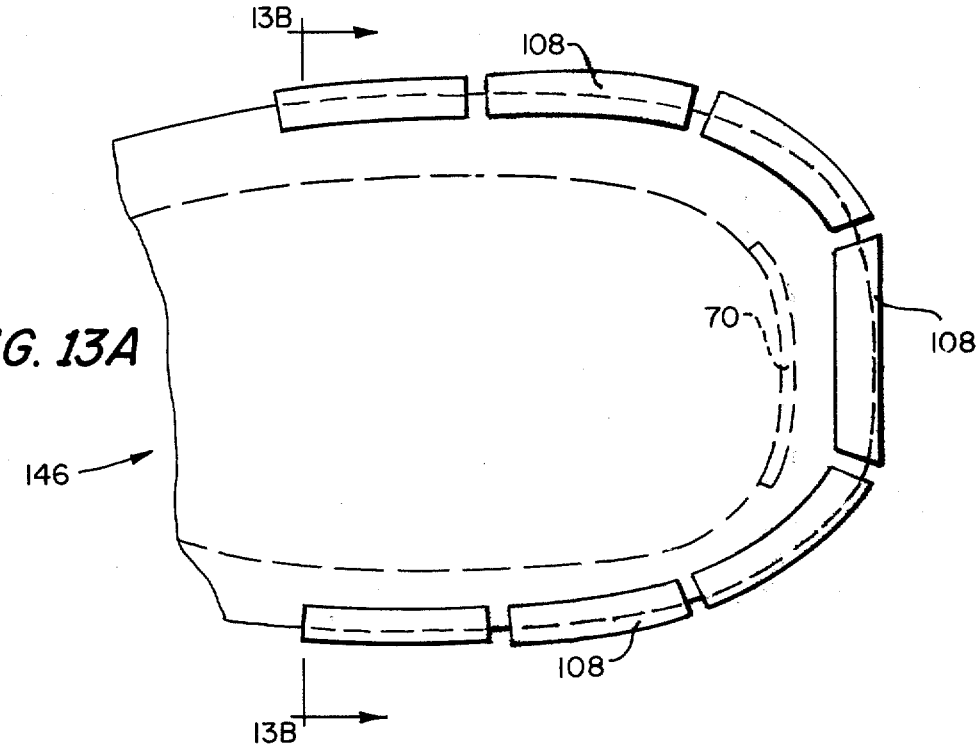
FIG. 13A is a view taken on the line 13A—13A of FIG. 13.
Figure 13B:
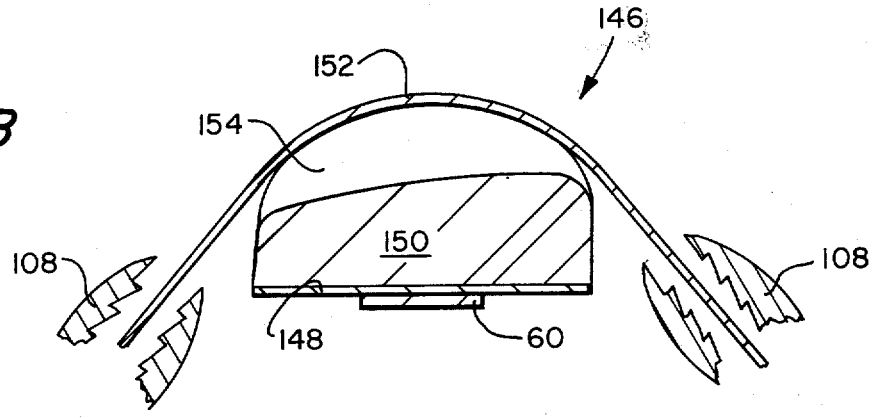
FIG. 13B is a view taken on the line 13B—13B of FIG. 13A.

Referring to FIGS. 13, 13A and 13B, a shoe assembly 146 is presented bottom-down to the machine. The shoe assembly 146 comprises a shoe insole 148 located on the bottom of a last 150 and a shoe upper 152 draped over the last. The top of the toe end of the last has an upwardly projecting knob 154. The insole 148 is placed by the operator against the insole rest 60, which thus constitutes a shoe assembly support, and the toe end of the last 150 is caused to bear against the toe bar 70. At this time, with the machine in its idle condition, all of the pincers 108 are located above the insole 148 and the margin of the upper 152 is inserted between the open jaws of all of the pincers.

Figure 12:
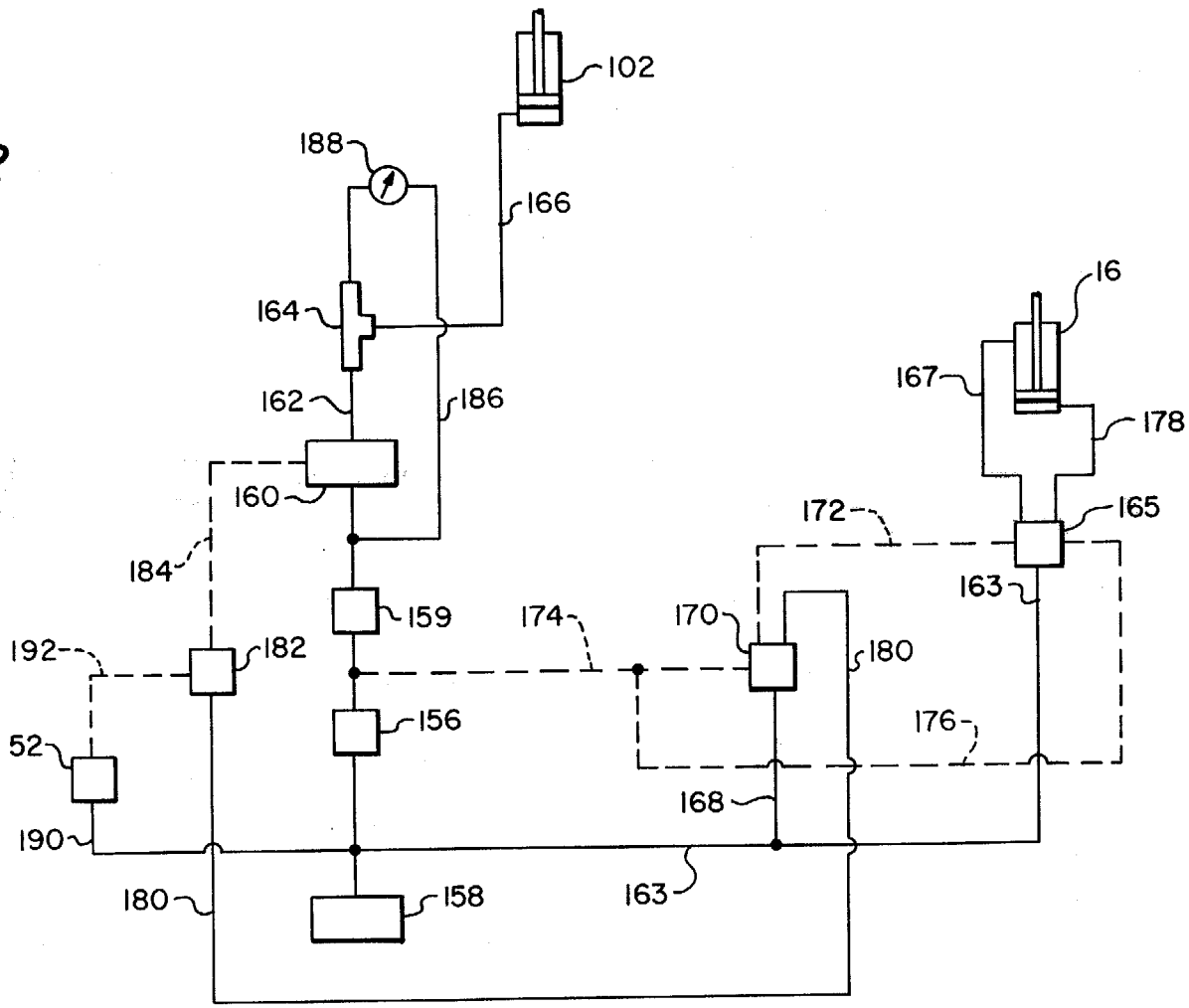
FIG. 12 is a circuit diagram of a portion of the machine control.

FIG. 12 schematically illustrates a portion of the pneumatic control circuit of the machine. The control for the motor 102 shown in this figure is illustrative of the controls for the motors 102 for the toe pincers assembly 94 and for those side pincers assemblies 96 that consist of the corner pincers assemblies and the forepart pincers assemblies.

After the upper margin has been inserted between the open jaws of all of the pincers 108, the jaws 112, 114 of all of the pincers assemblies are caused to grip the upper margin under a relatively heavy gripping force. With respect to all of the pincers assemblies, except the ball pincers assemblies, this is caused by shifting a valve 156 which enables pressurized air to pass under full line pressure from a source 158 through the valve 156, a valve 159, a spring return valve 160, a line 162, a shuttle valve 164 and a line 166 to the head end of a motor 102 to actuate the motor 102 to raise its piston rod 128. The rise of the piston rod 128 raises the cam roll 134, which acts as a pincers closing member, so as to cause the cam roll 134 to move between the cam follower surfaces 136 and 138 and swing the jaw leg 122 away from the jaw leg 120 to thereby swing the jaw 114 against the jaw 112 with the relatively high force imparted by the full line pressure of the air in the line 166 to thereby cause the jaws 112, 114 to close and grip the upper margin. During the rise of the cam roll 134 between the cam follower surfaces 136, 138, the cam follower surfaces are upwardly convergent and the cam roll moves upwardly between the cam follower surfaces under the yieldable force of pressurized air until it meets resistance to movement caused by the gripping action of the jaws 112, 114.

The motor 16 is retained in its idle position by pressurized air passing from the source 158 through a line 163, a valve 165 and a line 167 to the rod end of the motor 16. The valve 165 is maintained in position to enable the pressurized air to flow through it to the rod end of the motor 16 by pressurized air flowing from the source 158, the line 163, a line 168, a valve 170 and a pilot line 172 to the left side of the valve 165. The aforementioned shifting of the valve 156 enables pressurized air to flow from the valve 156 through a pilot line 174 to the valve 170 to shift the valve 170 and thus cut off the flow of pressurized air to the valve 165 through the pilot line 172. The shifting of the valve 156 also enables pressurized air to flow from the line 174 through a pilot line 176 to the right side of the valve 165 to thereby shift the valve 165. The shifting of the valve 165 cuts off the flow of pressurized air in the line 167 and enables pressurized air to flow from the valve 165 through a line 178 to the blind end of the motor 16 to thus actuate the motor 16 to raise its piston rod 16 and the parts, including the toe post 20 and the insole rest 60, mounted to the piston rod 16.

The shifting of the valve 170 also enables pressurized air to flow from the valve 170 through a line 180, a valve 182 and a pilot line 184 to the valve 160 to shift the valve 160 and thus cut off the flow of high pressure air flowing under full line pressure to the motor 102 through the line 162. With this cutting off of the flow of high pressure air to the motor 102, air under relatively low pressure flows to the motor 102 from the valve 159 through a line 186, a pressure regulator 188 set at the relatively low pressure, the shuttle valve 164 and the line 166.

As the toe post 20 completes its rise, the flange 49 engages the stud 50 to thereby lower the strip 34 relative to the plate 32 which causes the pin 46 to engage the actuator 56 and thus shift and open the valve 52. The opening of the valve 52 enables pressurized air to flow from the source 158 through a line 190, the valve 52 and a pilot line 192 to the valve 182 to shift the valve 182 to closed position and thus cut off the flow of pressurized air through the pilot line 184 to the valve 160 thereby enabling the return spring of the valve 160 to return this valve to open position. The opening of the valve 160 enables air under the relatively high full line pressure to again flow to the motor 102 through the line 162, the shuttle valve 164 and the line 166.

From the foregoing it can be seen that the upper margin is gripped by the stationary pincers 108 of the toe, corner and forepart pincers assemblies during the rise of the [show] *shoe* assembly 146, this rise being caused by the actuation of the motor 16 to raise the insole rest 60. The ball pincers assemblies may be forced downwardly under relatively low pressure to force the pincers 108 of these pincers assemblies downwardly during the rise of the shoe assembly. This rise causes the upper 152 to be stretched tightly about the vamp of the last 150. This stretching effect is enhanced by actuating the motor 86 to project its piston rod 88 to thereby swing the insole rest 60, together with the shoe assembly 146, counterclockwise as seen in FIG. 2 about the axis of the pivot pin 61. This stretching effect may also be enhanced by actuating the motors 98 of the ball pincers assemblies 96 to move their piston rods 100, together with their pincers 108 downwardly during the upward movement of the shoe assembly 146. The relatively low pressure imparted by the motors 102 of the toe pincers assembly 94, the corner pincers assembly 96 and the forepart pincers assemblies 96 to the piston rods 128 during the rise of the shoe assembly 146 lessens the upwardly directed force applied by the cam rolls 134 to the upwardly convergent follower surfaces 136, 138 of the pincers 108 of these pincers assemblies to thereby relax to some extend the gripping force applied against the margin of the upper 152 by the jaws 112, 114 of these pincers assemblies thereby enabling the upper margin to slip to some extent between these jaws during the rise of the shoe assembly. As stated above the last 150 of the shoe assembly 146 operated on by this machine has an upwardly projecting knob 154 at its toe end. This knob creates a stress of the upper 152 being stretched about the last 150 during the rise of the shoe assembly 146 while the upper margin is being gripped by the pincers 108 of the toe pincers assembly, the corner pincers assemblies and the forepart pincers assemblies, which stress could tear or rupture the upper. By enabling the upper margin to slip between the pincers jaws during the rise of the shoe assembly, this tearing or rupturing of the upper is avoided. When the shoe assembly 146 has completed its rise, the pincers 108 of all of the pincers assemblies 94, 96 are gripping the upper margin firmly under the relatively heavy force imparted by the high pressure of the motors 102 so that the upper margin cannot slip between the pincers jaws 112, 114 during the below described relocation of the upper 152 on the last 150.

The motors 98 of the toe pincers assembly, the corner pincers assemblies and the forepart pincers assemblies are maintained in their idle positions with the piston rods 100 of these assemblies projected upwardly of their motors 98 by pressurized air passing from the source to these motors through certain of the valves 144. Should the operator find that the stretched upper 152 is not properly located on or stretched about the last 150, he may move an appropriate handle 140 to shift the associated valve 144 which will actuate the associated motor 98 to retract its piston rod 100 downwardly and thereby force the associated pincers 108 downwardly while the pincers is firmly gripping the upper margin under the relatively heavy force. Others of the valves 144 are connected to the ball pincers assemblies in the manner shown in U.S. Pat. No. 3,233,261 so that the associated handles 140 may so actuate the motors 98 of the ball pincers assemblies as to either relieve the downwardly directed force imparted to the upper by the pincers 108 of these assemblies by the associated motors 98 or to increase these downwardly directed forces. In this manner, the stretched upper 152, if it is found to be desirable, may be relocated on the last 150.

Figure 6:
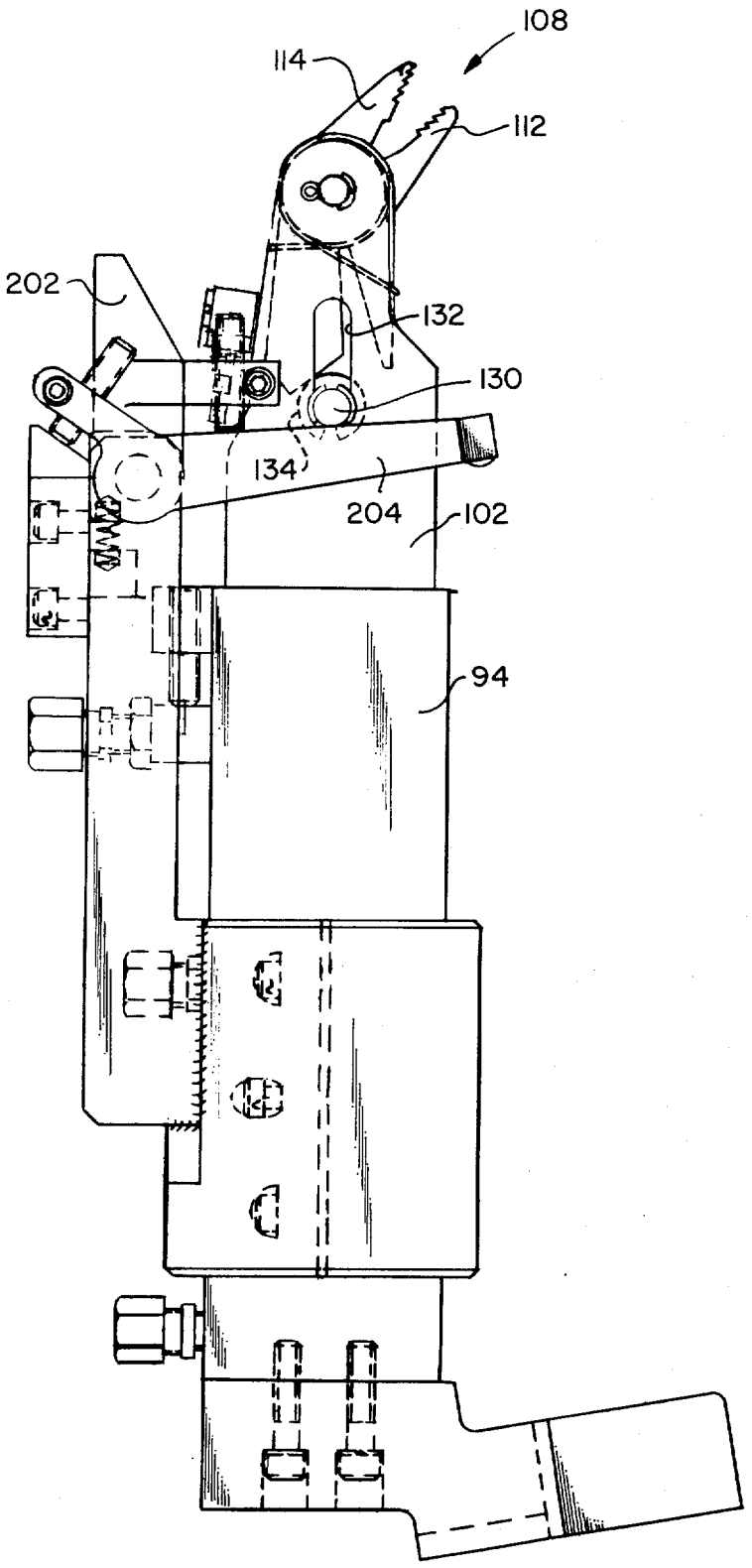
FIG. 6 is an elevation of a toe pincers assembly.
Figure 7:
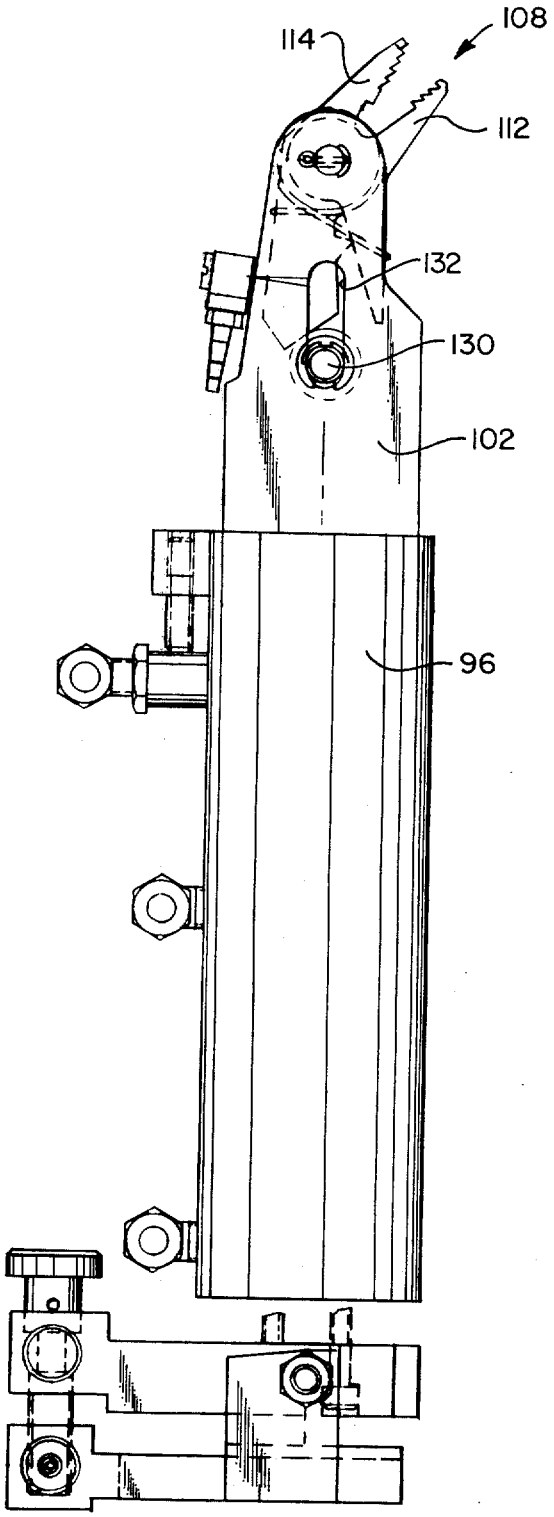
FIG. 7 is an elevation of a side pincers assembly.

The sequence of the remainder of the machine cycle is generally similar to that of the machine disclosed in British Patent specification No. 1,341,967. Referring to FIG. 1, a heel clamp 194 is brought to bear against the heel end of the shoe assembly 146, a toe hold-down 196 is brought to bear against the top of the vamp of the shoe assembly 146, the motor 62 is actuated to raise the cement applicator 68 against the insole 148 and cement is extruded from the cement applicator onto the insole, and a slide plate (not shown) which carries a toe pad 198 and toe wipers 200 is caused to move forwardly to a position wherein the toe pad clamps the toe portion of the upper 152 against the last 150. During the forward movement of the slide plate, an arm 202 of a bell crank that is mounted to the toe pincers assembly 94 is swing clockwise as seen in FIG. 6 to swing an arm 204 of this bell crank downwardly. The downwardly moving arm 204 engages a ledge 206 (FIG. 2) mounted to the toe bar 70 to thus move the toe bar and the post 72 downwardly against the force of the spring 74 to prevent the toe bar from interfering with the toe wipers 200 during the below described wiping stroke. This is followed by a forward and inward movement of the toe wipers with respect to the now stationary slide plate in a wiping stroke to cause the toe wipers to wipe the toe portion of the margin of the upper 152 against the insole 148 and bond the upper margin to the insole by means of the cement. Prior to the completion of the wiping stroke, all of the motors 102 are actuated to open all of the pincers 108 to enable the pincers to release the upper margin, the motor 62 is actuated to lower the cement applicator 68 and the motor 16 is actuated to lower the insole rest 60. At the completion of the wiping stroke the wiped toe portion of the shoe assembly 146 is supported by the toe wipers 200 and increased pressure is applied by the toe hold-down 196 against the top of the shoe assembly 146 to thereby provide a relatively heavy bedding pressure between the now wiped-in upper margin and the toe wipers 200. After the bedding pressure has been applied for a predetermined time interval, the machine parts are caused to be returned to their idle positions and the shoe assembly 146 is released from the machine.

I claim:

1. A pulling over mechanism comprising: a support, mounted for heightwise movement between lower and upper support positions, for supporting bottom-down a shoe assembly that includes a last having an upper mounted thereon; a pincers formed of a pair of jaws that are closable towards each other from an open position wherein the jaws are spaced from each other; means mounting the pincers for heightwise movement; pincers closing means operable to impart closing movement to the pincers jaws under a variable force; means retaining the pincers in an upper pincers position; means initially retaining the support in said lower support position; means thereafter raising the support from said lower support position to said upper support position to thereby raise the shoe assembly; means, effective during said rise of the support, to cause the pincers closing means to impart closing movement to the pincers jaws under a relatively light force against the margin of the upper which is inserted between the jaws; control means, effective *no earlier than as the support completes its rise to* [when the support has arrived at] said upper support position, to cause the pincers closing means to impart closing movement to the pincers jaws under a relatively heavy force; and means [thereafter] enabling the pincers to be lowered from said upper pincers position *when the support is in said upper support position.*

2. The mechanism as defined in claim 1 further comprising: means responsive to the arrival of the support at said upper support position to operate said control means.

3. The mechanism as defined in claim 2 further comprising: a post, to which the support is secured, mounted for heightwise movement; means initially retaining the post in a lower position to thereby retain the support in said lower support position; means for raising the post to thereby raise the support to said upper support position; means mounting said control means to said post for heightwise movement therewith; an actuator, located in registry with the control means above the control means, mounted to the post for heightwise movement; means yieldably urging the actuator upwardly with respect to the post; and a stud so fixedly located above the actuator in registry with the actuator as to lower the actuator with respect to the post and thus cause the actuator to actuate the control means when the post has raised the support to said upper support position.

4. A pulling over mechanism comprising: a support, mounted for heightwise movement between lower and upper support positions, for supporting bottom-down a shoe assembly that includes a last having an upper mounted thereon; a pincers base; a first motor, mounted to said pincers base, having a first rod that is movable heightwise in response to actuation of said first motor; a second motor, connected to said first rod, having a second rod that is movable heightwise in response to actuation of said second motor; a pincers, mounted to said second motor, formed of a pair of jaws that are closable towards each other from an open position wherein the jaws are spaced from each other; a pincers closing member connected to the second rod; said pincers jaws and said pincers closing member being so constructed and arranged as to cause the pincers closing member to close the jaws, in response to the raising of the second rod, an amount that is proportional to the elevation of the pincers closing member by the second rod; means causing the first motor to raise the first rod to thereby retain the pincers in an upper pincers position; means initially retaining the support in said lower support position; means thereafter raising the support from said lower support position to said upper support position to thereby raise the shoe assembly; means, effective during said rise of the support, to cause the second motor to move the second rod upwardly under relatively low pressure to thereby cause the pincers closing member to impart closing movement to the pincers jaws under a relatively light force against the margin of the upper which is inserted between the jaws; control means, effective *no earlier than as the support complete its rise to* [when the support has arrived at] said upper support position, to cause the second motor to move the second rod upwardly under relatively heavy pressure to thereby cause the pincers closing member to impart closing movement to the pincers jaws under a relatively heavy force; and means [thereafter] enabling the first motor to be actuated to lower the first rod and thereby lower the pincers from said upper pincers position *when the support is in said upper support position.*

5. The mechanism as defined in claim 4 further comprising: means responsive to the arrival of the support at said upper support position to operate said control means.

6. The mechanism as defined in claim 5 further comprising: a post, to which the support is secured, mounted for heightwise movement; means initially retaining the post in a lower position to thereby retain the support in said lower support position; means for raising the post to thereby raise the support to said upper support position; means mounting said control means to said post for heightwise movement therewith; an actuator, located in registry with the control means above the control means, mounted to the post for heightwise movement; means yieldably urging the actuator upwardly with respect to the post; and a stud so fixedly located above the actuator in registry with the actuator as to lower the actuator with respect to the post and thus cause the actuator to actuate the control means when the post has raised the support to said upper support position.

* * * * *